United States Patent
Charier et al.

(10) Patent No.: US 11,293,300 B2
(45) Date of Patent: Apr. 5, 2022

(54) AIRCRAFT TURBINE ENGINE WITH AT LEAST TWO BODIES AND MEANS FOR DRAWING POWER

(71) Applicant: SAFRAN AIRCRAFT ENGINES, Paris (FR)

(72) Inventors: Gilles Alain Marie Charier, Moissy-Cramayel (FR); Caroline Marie Frantz, Moissy-Cramayel (FR); Loïc Paul Yves Guillotel, Moissy-Cramayel (FR); Vincent François Georges Millier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/253,551

(22) PCT Filed: Jun. 13, 2019

(86) PCT No.: PCT/FR2019/051427
§ 371 (c)(1),
(2) Date: Dec. 17, 2020

(87) PCT Pub. No.: WO2019/243712
PCT Pub. Date: Dec. 26, 2019

(65) Prior Publication Data
US 2021/0164358 A1     Jun. 3, 2021

(30) Foreign Application Priority Data
Jun. 22, 2018   (FR) ...................................... 1855607

(51) Int. Cl.
| *F01D 15/12* | (2006.01) |
| *F02C 7/32* | (2006.01) |
| *F01D 25/16* | (2006.01) |

(52) U.S. Cl.
CPC ........... *F01D 15/12* (2013.01); *F01D 25/164* (2013.01); *F02C 7/32* (2013.01); *F05D 2220/323* (2013.01); *F05D 2230/60* (2013.01)

(58) Field of Classification Search
CPC .... F02C 7/32; F02C 7/36; F01D 15/10; F01D 15/12; F01D 25/16; F01D 25/162;
(Continued)

(56) References Cited

U.S. PATENT DOCUMENTS

| 4,973,221 A | 11/1990 | Anderson et al. |
| 7,552,591 B2 * | 6/2009 | Bart .......................... F02C 7/32 |
| | | 60/802 |

(Continued)

FOREIGN PATENT DOCUMENTS

| EP | 1701019 A1 | 9/2006 |
| FR | 2645907 A1 | 10/1990 |

(Continued)

OTHER PUBLICATIONS

International Search Report dated Sep. 19, 2019, issued in corresponding International Application No. PCT/FR2019/051427, filed Jun. 13, 2019, 6 pages.

(Continued)

*Primary Examiner* — Woody A Lee, Jr.
*Assistant Examiner* — Elton K Wong
(74) *Attorney, Agent, or Firm* — Christensen O'Connor Johnson Kindness PLLC

(57) ABSTRACT

An aircraft turbine engine includes a low-pressure body and a high-pressure body, as well as means for drawing power on said low-pressure body, said means having a first shaft for drawing power, the radially inner end of said first shaft bearing a first bevel gear meshed with a first idler bevel wheel driven by the low-pressure body, the turbine engine further having a first annular bearing support which extends about an axis and is rigidly connected to a stator. The first bearing support includes a first cylindrical portion which extends coaxially with a second substantially cylindrical portion of the idler wheel, said first and second portions being guided one inside the other by bearings, and the idler wheel is driven by the low-pressure body by means of an annular damping piece which is independent of the first bearing support.

11 Claims, 3 Drawing Sheets

(58) Field of Classification Search
CPC .... F01D 25/164; F01D 25/166; F01D 25/168; F05D 2230/60; F05D 2220/323; B64D 41/00; B64D 2041/002
See application file for complete search history.

(56) References Cited

U.S. PATENT DOCUMENTS

| | | |
|---|---|---|
| 10,487,747 B2 | 11/2019 | Curlier et al. |
| 2012/0213629 A1 | 8/2012 | Rouesne |
| 2012/0288369 A1* | 11/2012 | Houradou ............. F01D 25/162 403/319 |
| 2017/0044987 A1* | 2/2017 | Curlier ...................... F02C 7/06 |

FOREIGN PATENT DOCUMENTS

| | | |
|---|---|---|
| FR | 3026775 A1 | 4/2016 |
| WO | 9947799 A1 | 9/1999 |
| WO | 2015166187 A1 | 11/2015 |

OTHER PUBLICATIONS

Written Opinion of the International Searching Authority dated Sep. 19, 2019, issued in corresponding International Application No. PCT/FR2019/051427, filed Jun. 13, 2019, 6 pages.

* cited by examiner

AIRCRAFT TURBINE ENGINE WITH AT LEAST TWO BODIES AND MEANS FOR DRAWING POWER

TECHNICAL FIELD

The present invention relates to an aircraft turbine engine with at least two bodies and equipped with means for drawing power.

BACKGROUND

The prior art comprises documents EP-A1-1 701 019, WO-A1-99/47799, US-A1-2012/213629, FR-A1-2 645 907, FR-A1-3 026 775 and WO-A1-2015/166187.

The aviation world is now asking many questions about the relevance of using hybrid engines for commercial aviation. The use of electrical energy is now being considered not only to meet aircraft functions, but also to electrify functions of the turbine engine.

This leads to the study of hybrid engine architecture solutions, combining fossil fuel energy and electrical energy to drive the propulsive part (fan of the turbine engine) and power certain engine and/or aircraft functions.

These architectures can be based on a high bypass ratio and reduction gear architecture, but also on a multiple-body architecture (2 or 3 bodies). In these architectures, the turbine engine comprises a low-pressure body and a high-pressure body, each body comprising a shaft connecting a rotor of a compressor to a rotor of a turbine.

It is known to draw mechanical power from one of these bodies and to return this power to an electrical generator in order to produce electrical energy. This generator can also act as a starter and therefore as an electric motor when the turbine engine starts.

Means for drawing power on a turbine engine body conventionally comprise a power drawing shaft, one end of which carries a bevel gear meshed with an idler bevel wheel driven by the body.

With the technologies currently known, the integration of a high power drawing on the low-pressure body of a turbine engine, in particular with a high bypass and reduction ratio, is very complex. The dimensions and space required for the power drawing means are too large to envisage an integration similar to that of drawing means on a high-pressure body. It is therefore not possible to mount an idler wheel directly on the shaft of the low-pressure body.

A solution could be to add a gear train between the shaft of the low-pressure body and the power drawing shaft. However, the drawing means would become more complex and bulky due to the high number of parts required.

The dimensional chain would comprise several gears, one of which would be fixed directly on the shaft of the low-pressure body. The bearings for guiding the body would be axially distant from this gear, which could lead to problems in respecting the meshing clearance between the gears.

In addition, a high bypass ratio turbine engine is characterized in particular by a reduced diameter of the engine (which is of the wasp waist type). The flow duct of the primary flow in the engine thus has a small internal diameter, which reduces in particular the annular space available between the bodies and this duct extending around the bodies. The power drawing means and in particular the above-mentioned gear train could not be mounted there because they would be too bulky radially and would interfere with the duct.

Finally, it has been observed that the power drawing means tend to transmit vibrations and dynamic stresses to bearings, through the supports of these bearings. These vibrations can be detrimental to the operation and service life of the bearings as well as the turbine engine.

The present invention offers a solution to at least some of the problems mentioned above.

DESCRIPTION OF THE INVENTION

The invention provides an aircraft turbine engine, this turbine engine comprising at least one low-pressure body and one high-pressure body, as well as means for drawing power on at least said low-pressure body, said drawing means comprising a first power drawing shaft extending substantially radially with respect to a longitudinal axis of rotation of said bodies, this first drawing shaft comprising a radially inner end carrying a first bevel gear meshed with a first idler bevel wheel driven by said low-pressure body, the turbine engine further comprising a first annular bearing support extending around said axis and integral with a stator, characterized in that said first bearing support comprises a first substantially cylindrical portion which extends coaxially with a second substantially cylindrical portion of said idler wheel, said first and second portions being guided one inside the other by bearings, and said idler wheel is driven by said low-pressure body through an annular damping part which is independent of said first bearing support.

The present invention thus offers a solution to the power drawing on a low-pressure (or LP) body.

It is understood that the idler wheel is driven by the body via a damping part which is capable of absorbing vibrations and/or dynamic stresses due to its elastic deformation capacity. In addition, the bearing support is independent of this damping part, which therefore does not transmit vibrations and/or dynamic stresses to the bearing support as well as to the bearings with which the bearing support is associated. This guarantees an optimal function of the bearings and in particular an optimal guidance of the parts centered by these bearings, such as for example the power drawing shaft.

The turbine engine according to the invention may comprise one or more of the following features, taken alone or in combination with each other:

- said first and second portions are guided by two adjacent bearings axially spaced from each other, such as a ball bearing and a roller bearing,
- said first bearing support is fixed or connected to a housing for guiding said drawing shaft,
- said first bearing support has in axial half-section a generally L-shape whose radially inner periphery comprises said first portion and is intended to be surrounded at least in part by said idler wheel,
- said idler wheel has in axial half-section a generally L-shape whose radially inner periphery comprises said second portion and is intended to be surrounded at least in part by said bearing support,
- said idler wheel is driven by said low-pressure body via an annular damping part having a capacity for elastic deformation in torsion around said axis and/or in radial direction,
- said idler wheel is driven by said low-pressure body via an annular damping part having an annular row of through orifices and/or having an annular portion with a C-shaped axial half-section, the opening of which is oriented axially upstream or downstream, said first bevel gear and said first idler wheel are housed in an enclosure for lubricating a bearing for guiding the high-pressure body, the turbine engine also comprises means for drawing power on said high-pressure body, said drawing means comprising a second power drawing shaft extending substantially radially with respect to said axis and comprising a radially inner end carrying a second bevel gear meshing with a second idler bevel wheel driven by said high-pressure body, said second gear and said second idler wheel being housed in said lubrication enclosure, the turbine engine comprises an intermediate casing comprising an annular shroud around which is arranged an annular row of tubular arms, this shroud separating said lubrication enclosure from an annular gas flow duct extending around this enclosure, and extending axially between said first bearing support and said bearing for guiding the high-pressure body, said first and second drawing shafts extending through different arms of this intermediate casing.

The present invention also relates to a method of modular assembly of a turbine engine as described above, comprising the steps of:

(a) assembling a first module of a turbine engine, this first module comprising at least a part of the high-pressure body, at least a part of the intermediate casing, a part of the low-pressure body including its main shaft, as well as the second power drawing means, (b) mounting a second turbine engine module and assembling it by axial translation from upstream on and around a part of said first module, said second module comprising said first bearing support and said first power drawing means, and (c) mounting a third turbine engine module and assembling it by axial translation from upstream, this third module comprising a part of the low-pressure body including a secondary shaft, as well as said damping part, this third module comprising a part engaged radially between parts of said first and second modules, this assembly enabling to engage the main and secondary shafts of the low-pressure body via splines, on the one hand, and, the damping part carried by said secondary shaft with said idler wheel or an intermediate part already engaged with this idler wheel via other splines, on the other hand.

DESCRIPTION OF THE FIGURES

The invention will be better understood and other details, characteristics and advantages of the invention will appear when reading the following description made as a non-limitative example with reference to the attached drawings, in which.

DETAILED DESCRIPTION

Figure 1:
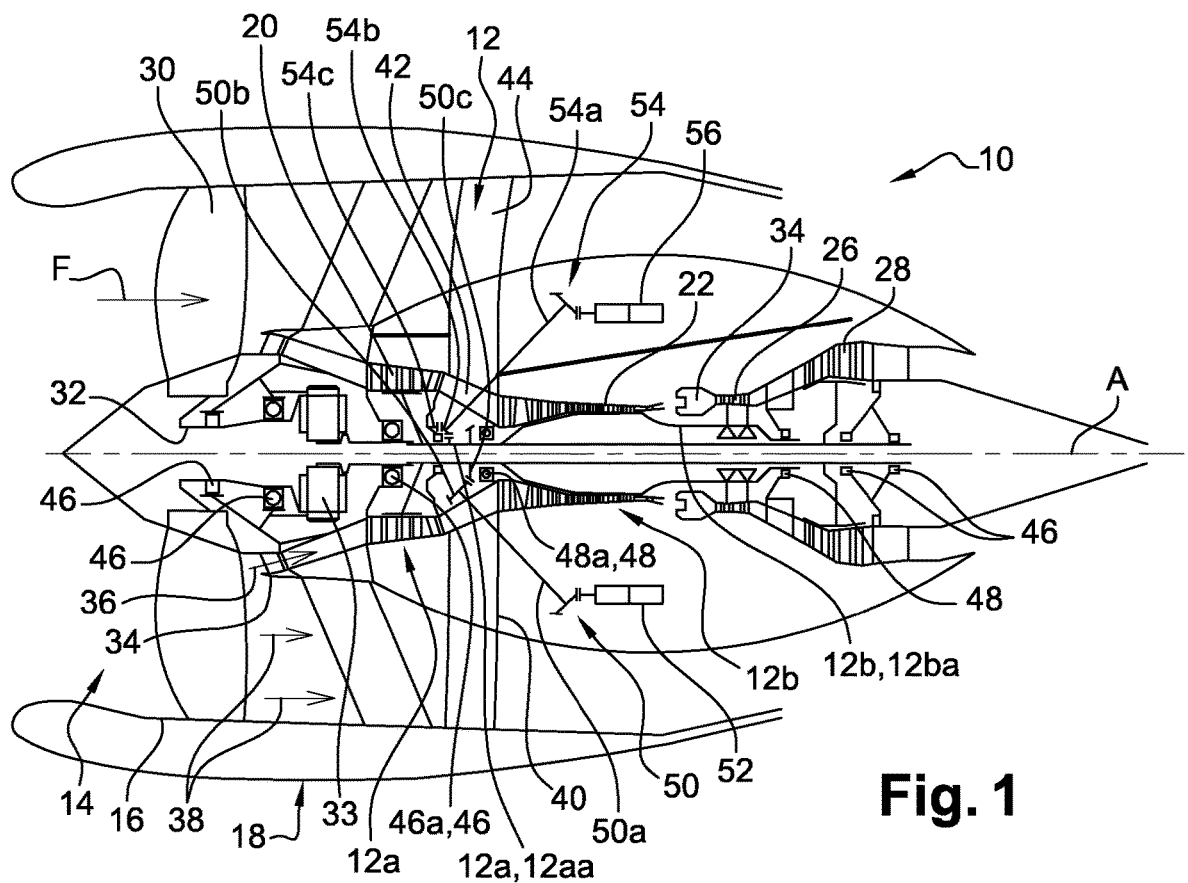
FIG. 1 is a schematic axial section view of a high bypass ratio aircraft turbine engine and reduction gear.

First, we refer to FIG. 1, which schematically represents a double-body, double-flow aircraft turbine engine 10.

The turbine engine 10 comprises in a conventional way a gas generator 12 upstream of which is arranged a fan 14. The fan 14 is surrounded by a fan casing 16 which is part of a nacelle 18 that extends around and along a major part of the gas generator 12.

The gas generator 12 here comprises two bodies, namely a low-pressure body 12a or LP and a high-pressure body 12b or HP. Each body comprises a compressor and a turbine.

The terms "upstream" and "downstream" are considered according to a main direction F of gas flow in the turbine engine 10, this direction F being parallel to the longitudinal axis A of the turbine engine.

From upstream to downstream, the gas generator 12 comprises a low-pressure compressor 20, a high-pressure compressor 22, a combustion enclosure 24, a high-pressure turbine 26 and a low-pressure turbine 28.

The fan 14 comprises an annular row of vanes 30 driven in rotation by a fan shaft 32 which is connected to the rotor of the low-pressure body 12a via a reduction gear 33.

The gas flow that passes through the fan (arrow F) is separated upstream of the gas generator 12 by an annular nozzle 34 into a radially internal annular flow, called the primary flow 36 which feeds the gas generator 12, and a radially external annular flow, called the secondary flow 38 which flows between the gas generator 12 and the nacelle 18 and provides most of the thrust of the turbine engine.

An intermediate casing 40 is located between the low-pressure compressors 20 and high-pressure compressors 22 and structurally connects the gas generator 12 to fan casing 16 and nacelle 18. The intermediate casing 40 comprises an annular row of radially inner arms 42 extending into the primary flow 36, between the duct of the low-pressure compressors 20 and high-pressure compressors 22, and an annular row of radially outer arms 44 extending into the secondary flow 38. The arms 42, 44 are generally limited in number (less than ten), tubular and crossed by auxiliaries.

The rotor of the low-pressure body 12a and the fan shaft 32 are guided by bearings 46. The rotor of the high-pressure body 12b is guided by bearings 48. The bearings 46, 48 are ball or roller bearings and each comprise an inner ring mounted on the shaft to be guided, an outer ring carried by an annular bearing support and a rolling element between the rings.

The bearing supports extend around the axis A and are fixed parts connected to the stator and e.g. to the intermediate casing 40 in the case of ball bearings 46a, 48a for guiding the upstream ends of the LP and HP rotors. Each of the LP and HP rotors comprises a main shaft and possibly annular attachments such as trunnion, etc.

Figure 2:
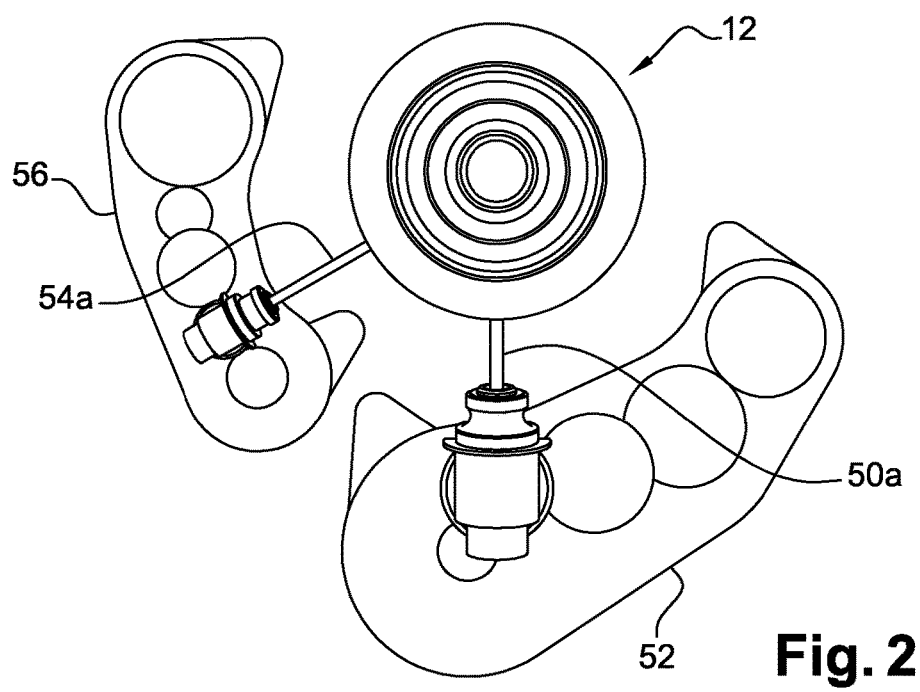
FIG. 2 is a schematic view of means for drawing power on low-pressure and high-pressure bodies of a turbine engine.

The turbine engine 10 comprises means 50 for drawing power on the HP body 12b, which comprises a power drawing shaft 50a which has a substantially radial orientation with respect to the axis A. The shaft 50a has its radially inner end which is located adjacent to the HP body and carries a bevel gear 50b which meshes with an idler wheel 50c integral with the upstream end of shaft 12ba of the HP body 12b. The radially outer end of the shaft 50a is connected to gears of an accessory gear box 52, commonly called AGB (FIGS. 1 and 2). The accessory gear box 52 is located in an annular space around the gas generator 12 between the primary and secondary flow ducts 36, 38. The shaft 50*a* passes through the primary flow duct through one of the arms 42 of the intermediate casing 40.

The turbine engine 10 further comprises means 54 for drawing power on the LP body 12*a*, which comprises a power drawing shaft 54*a* which has a substantially radial orientation with respect to the axis A. The shaft 54*a* has its radially inner end which is located in the vicinity of the LP body and carries a bevel gear 54*b* which meshes with an idler wheel 54*c* integral with the upstream end of the shaft 12*aa* of the LP body. The radially outer end of the shaft 54*a* is connected to gears of another accessory gear box 56, commonly called AGB (FIGS. 1 and 2). The accessory gear box 56 is located in the above-mentioned annular space and shaft 54*a* passes through the flow duct of the primary flow through another of the arms 42 of the intermediate casing 40.

Figure 3:
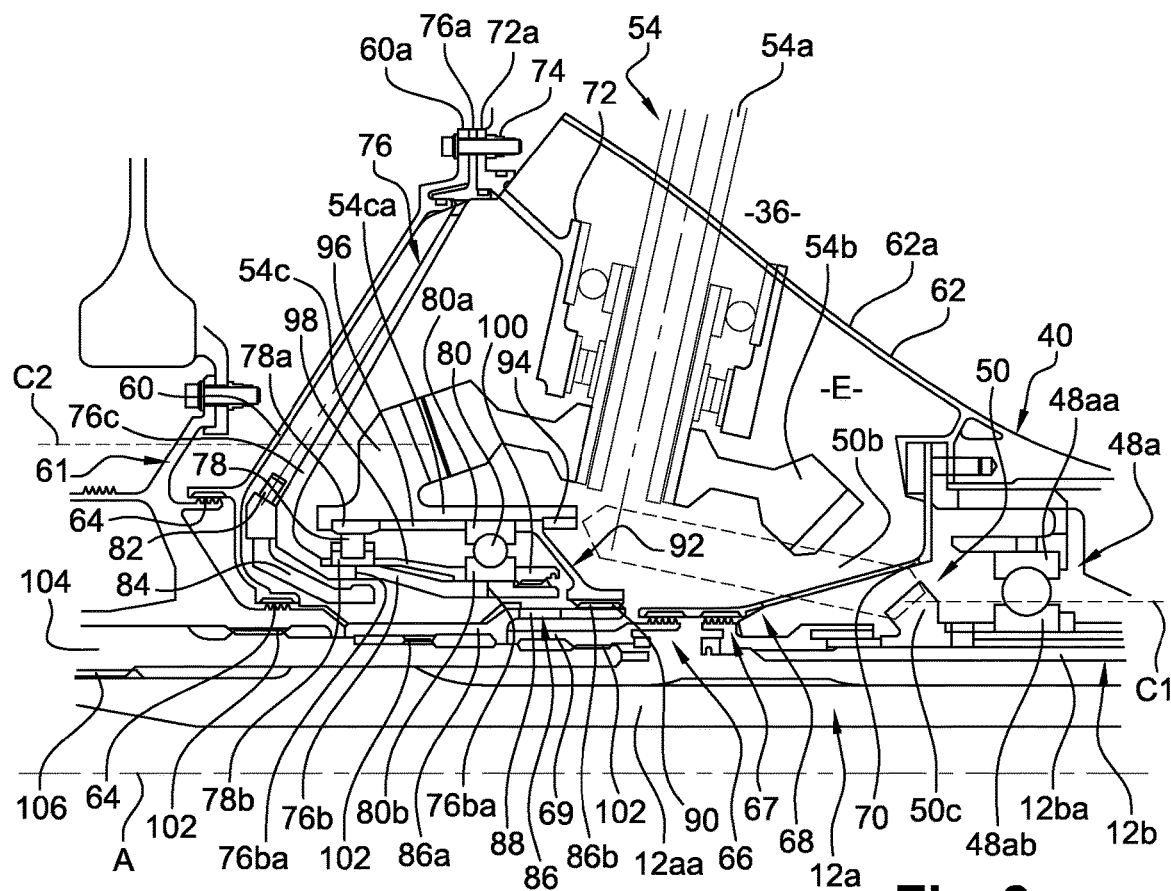
FIG. 3 is a partial schematic half-view in axial section of power drawing means according to an embodiment of an aircraft turbine engine according to the invention.

As can be better seen in FIG. 3, the bearing 48*a* for guiding the shaft 12*ba* of the HP body 12*b* is located in an annular enclosure E for lubricating this bearing. This enclosure E has a half-axial section with a generally triangular shape. Here it is delimited at its inner periphery by the upstream end of the shaft 12*ba* of the HP body 12*b* and by a portion of the shaft 12*aa* of the LP body 12*a* which passes axially through the shaft 12*ba* of the HP body 12*b*. The enclosure E is further delimited, on the upstream side, by an annular cover 60 and, on the downstream side, by a frustoconical shroud 62 of the intermediate casing 40 whose radially outer peripheral surface 62*a* internally delimits the flow duct of the primary flow 36.

The cover 60 has a generally frustoconical shape, the smaller diameter upstream end of which surrounds the above-mentioned portion of the shaft 12*aa* of the LP body 12*a*, and the larger diameter downstream end of which is fixed, for example by bolts 74, to the larger diameter upstream end of the shroud 62. The smaller diameter downstream end of the shroud 62 carries the outer ring 48*aa* of the bearing 48*a*, its inner ring 48*ab* being rotationally fixed to the upstream end of the shaft 12*ba* of the HP body 12*b*.

The enclosure E is thus delimited by rotor and stator parts. The enclosure E is sealed by annular seals at the gaps between the rotor and stator parts. This is the case between the cover 60 and a trunnion 61 which is rotationally fixed to the LP body 12*a* where labyrinth seals referenced 64 are located. This is also the case between the intermediate casing 40 and the shafts 12*aa*, 12*ba* of the LP and HP bodies, labyrinth seals 66, 67 being located between a sealing ring 68 fixed to the casing 40 and these bodies 12*a*, 12*b*. The ring 68 is fixed by its radially outer end to the casing 40 and its radially inner end comprises a cylindrical portion carrying abradable elements, a first, upstream, of which cooperates with annular lashings projecting from the seal 66 located on an annular part 69 of the LP body 12*a*, and a second, downstream, of which cooperates with annular lashings projecting from the seal 67 located at the upstream end of the shaft 12*ba* of the HP body 12*b*.

With regard to the means 50 for drawing power on the HP body 12*b*, the idler wheel 50*c*, the gear 50*b* and the radially inner end of the shaft 50*a* (not shown here) are housed in the enclosure E.

Similarly, for the means 54 for drawing power on the LP body 12*a*, the idler wheel 54*c*, the gear 54*b* and the radially inner end of shaft 54*a* are housed in the enclosure E.

The shafts 50*a*, 54*a* can be inclined with respect to a plane perpendicular to the axis A of the turbine engine, and can have similar angles of inclination, as in the example shown.

As mentioned above and shown in FIG. 2, shafts 50*a*, 54*a* do not pass through the same arms of the intermediate casing 40 and therefore form an angle with each other. For example, they are respectively housed in the arms located at 6 and 8 o'clock by analogy with the dial of a clock. The gear 50*b* is represented in dotted lines in FIG. 3 to facilitate the understanding of the invention but it is not located in the sectional plane of the view.

The meshing between the gear 50*b* and the idler wheel 50*c* is located substantially on a circumference C1 whose diameter is smaller than that of the circumference C2 of meshing of gear 54*b* with the wheel 54*c*.

The ring 68 comprises a through aperture 70 which is traversed by the gear 50*b* which can rotate in this aperture. As indicated above, this aperture 70 is shown to facilitate the understanding of the invention but is not in the sectional plane of the view.

The radially inner end of the shaft 54*a* is guided by a housing 72 attached to the cover 60 and the intermediate casing 40. The housing 72 comprises here two coaxial bearings, respectively roller and ball bearings, and comprises a radially outer annular flange 72*a* for attachment to a radially outer annular flange 60*a* of the cover 60.

The flanges 72*a*, 60*a* are fastened to each other or also to the intermediate casing 40 by means of the bolts 74 and a radially outer annular flange 76*a* of a annular bearing support 76 is here inserted between these flanges 72*a*, 60*a*.

The support 76 carries bearings 78, 80 for guiding the idler wheel 54*c*. The idler wheel 54*c* comprises a cylindrical wall 54*ca* which is integral with the outer rings 78*a*, 80*a* of the bearings 78, 80, which are here adjacent to and axially spaced from each other. The bearing 78 is a roller bearing and is located upstream, and the other bearing 80, downstream, is a ball bearing. The inner rings 78*b*, 80*b* of the bearings 70, 80 are integral with a substantially cylindrical wall 76*b* of the bearing support 76. Conversely, the bearing 78 is a roller bearing and could be located downstream, and the other bearing 80, here upstream, is a ball bearing.

It is therefore understandable that the wall 76*b* of the bearing support 76 extends radially inside the wall 54*ca* of the wheel. The wall 76*b* is connected to the flange 76*a* by a frustoconical wall 76*c* which flares radially outwards from upstream to downstream. As shown in FIG. 3, the wall 76*c* extends along the cover 60 and defines with it an annular space into which an oil circulation line 82 may extend. The wall 76*b* extends around and at a radial distance from the LP body 12*a* and defines with it an annular space in which an annular row of oil nozzles 84 connected to the line 82 is housed. The nozzles 84 are configured to spray oil to the bearings 78, 80, which is sprayed onto the radially inner surface of the wall 76*b* and is directed to bearings 78, 80 through bores 76*ba* of the wall 76*b*.

It is therefore understood that the bearing support 76 is integral with the cover 60 and is part of a stator of the turbine engine. The idler wheel 54*c* is rotationally connected to the LP body 12*a* by means of an annular damping part 86.

In the example shown, the part 86 is attached to the LP body 12*a*. It comprises a substantially cylindrical upstream portion 86*a* which is clamped axially between the trunnion 61 and the part 69. In addition, it has a downstream portion 86*b* of larger diameter which comprises an annular row of through holes 88 and an annular row of external splines 90. The holes 88 are positioned and dimensioned to give part 86 a certain torsional flexibility, so that the part is able to dampen vibrations and/or dynamic stresses during operation. The splines 90 cooperate with complementary splines on the inner periphery of an annular connecting part 92, the outer periphery of which is fixed to the idler wheel 54*c* and is, for example, clamped between the outer ring 80*a* of the bearing 80 and a nut 94 which is attached and screwed radially inside the wall 54*ca* of the idler wheel 54*c*. A spacer 96 is inserted between the outer rings 78*a*, 80*a* of the bearings 78, 80 to keep them spaced and in position. Similarly, a spacer 98 is interposed between the inner rings 78*b*, 80*b* of the bearings 78, 80 and a nut 100 is inserted and screwed radially outside the cylindrical wall 76*b* of the bearing support 76.

In addition, spline sets 102 are provided to connect the trunnion 61, damping part 86 and part 69 to the rest of the LP body 12*a* in a rotationally fixed manner. The trunnion 61, damping part 86 and part 69 comprise internal splines that cooperate with external splines on a shaft 104 of the LP body, which in turn cooperates with the shaft 12*aa* of the LP body 12*a* by means of another set of splines 106.

The shaft 104 can be the input shaft of the reduction gear 33 or the fan shaft 14 when the turbine engine does not comprise a reduction gear.

Figure 4:
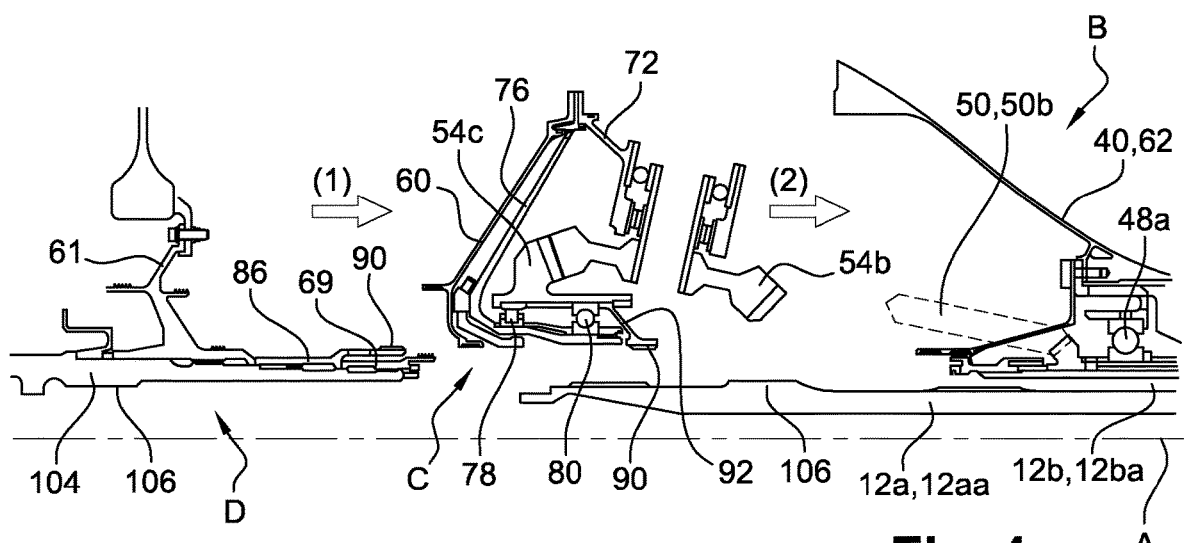
FIG. 4 is a view similar to that of FIG. 3 and represents modular assembly steps of the turbine engine of this FIG. 3.

FIG. 4 shows the modular assembly of turbine engine 10 in a very schematic way. Three modules are shown here and assembled by axial translation towards each other and engaged axially into each other.

The modules are preferably pre-assembled and then fixed to each other. The first module B, shown on the right-hand side of the drawing, comprises at least part of the high-pressure body 12*b*, at least part of the intermediate casing 40, part of the low-pressure body 12*a* including its main shaft 12*aa*, as well as the second power drawing means 50.

The second module C, in the center, comprises the cover 60, the bearing support 76, the housing 72, the power drawing means 54, and the connecting part 92. It should be noted that the support 76 carries the bearings 78, 80 for guiding the idler wheel 54*c* as described above.

The third module D, on the left, comprises the shaft 104, the trunnion 61, and the parts 86, 69. This third module is inserted axially inside the second module C, until the splines 90 of the damping part 86 and connecting part 92 cooperate with each other.

The assembly comprising the second and third modules C, D is then mounted on the first module B, by axial translation from upstream to downstream, until the splines 106 of the shafts 104, 12*aa* cooperate together.

Figure 5:
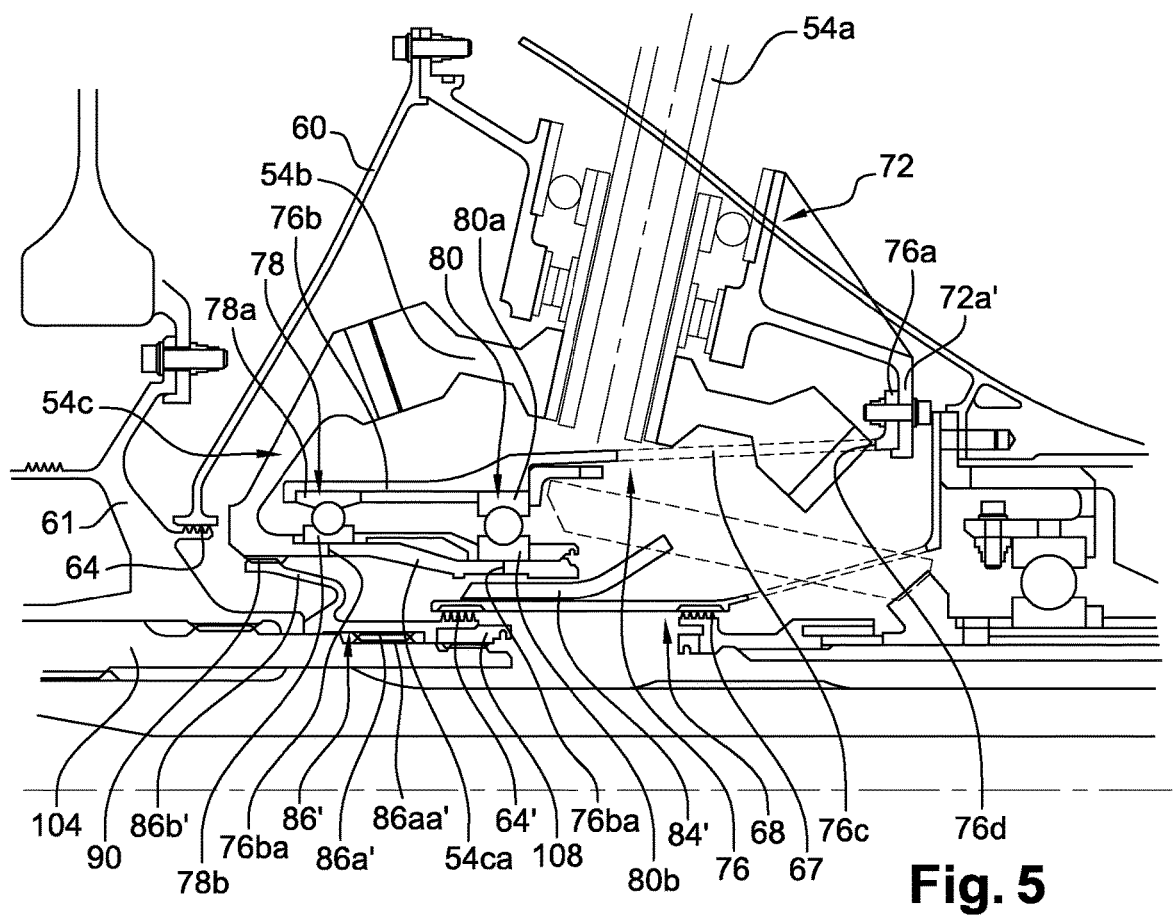
FIG. 5 is a partial schematic half-view in axial section of power drawing means according to a variant of embodiment of an aircraft turbine engine according to the invention.
Figure 6:
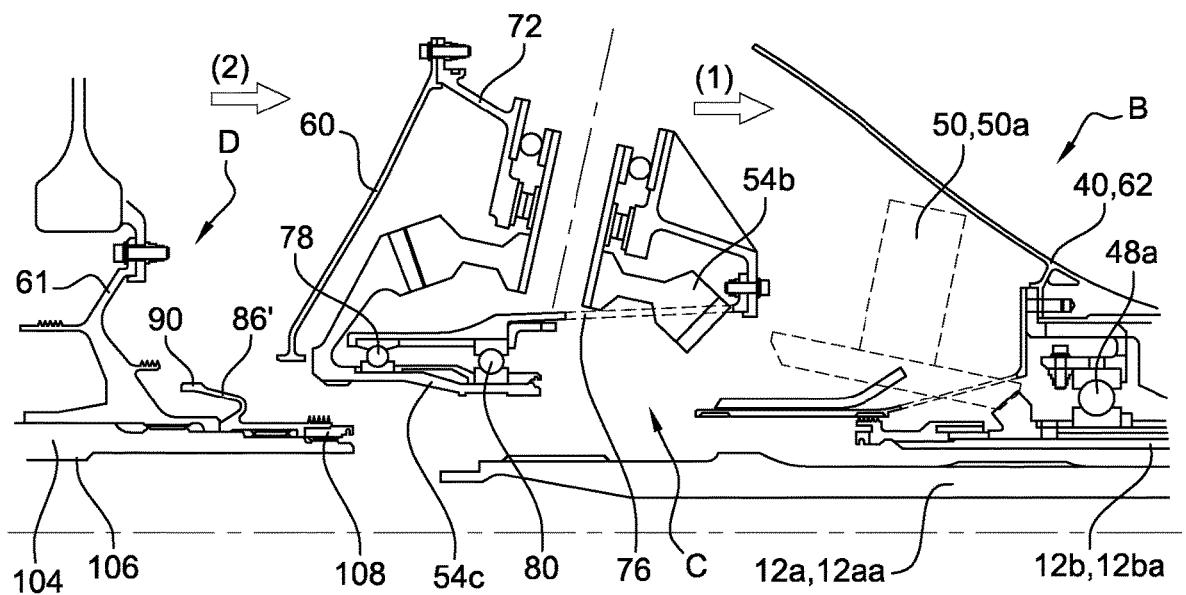
FIG. 6 is a view similar to that of FIG. 5 and represents modular assembly steps of the turbine engine of this FIG. 5.

FIGS. 5 and 6 are similar to FIGS. 3 and 4 and illustrate a variation of embodiment of the invention. This variant comprises essentially the same characteristics as those described above in relation to the first embodiment.

The essential difference is that the cylindrical part 54*ca* of the idler wheel 54*c* is here located radially inside (and no longer outside) the cylindrical wall 76*b* of the bearing support 76.

It is therefore understood that the outer rings 78*a*, 80*a* of the bearings 78, 80 are here attached to the wall 76*b*, and the inner rings 78*b*, 80*b* are attached to the wall 54*ca*.

The bearing support 76 has its radially outer flange 76*a* which is attached to a radially inner annular flange 72*a*' of the housing 72. The wall 76*c* of the bearing support 76 comprises a through-opening 76*d* for passage and rotation of the gear 54*b* because the wall 76 here extends radially inward from the radially inner end of the power drawing shaft 54*a*.

The wall 54*ca* of the idler wheel 54*c* extends around the LP body 12*a*, the idler wheel being rotationally fixed to the LP body through a single annular part, which is the damping part 86'. This part 86' is here clamped axially between the trunnion 61, located upstream, and a nut 108 downstream. The assembly is mounted on the shaft 104.

The part 86' comprises a radially inner cylindrical portion 86*a*' extending between the trunnion 61 and the nut 108 and coupled by internal splines 86*aa*' to complementary external splines of the shaft 104, and a radially outer flexibility portion 86*b*'. This portion 86*b*' has a C-shaped axial half-section with the opening oriented axially, here upstream. This 86*b*' portion comprises external splines 90 on its outer periphery which cooperate with complementary internal splines of the wall 54*ca* of the idler wheel.

The lubricating oil for the bearings 78, 80 is not supplied here from upstream of the idler wheel 54*c*, but from downstream. The oil nozzles 84' are located in the annular space between the wall 54*ca* of the idler wheel 54*c* and the ring 68.

Labyrinth type seals 64, 64' are located here between the cover 60 and the trunnion 61 and between the downstream end of the part 86' and the upstream end of the seal ring 68. Another labyrinth type seal 67 is located between the seal ring 68 and the upstream end of the shaft 12*ba* of the HP body 12*b*.

FIG. 6 shows in a very schematic way the modular assembly of this variant of the turbine engine 10. Three modules are shown here and assembled by axial translation towards each other and engaged axially into each other.

The modules are preferably pre-assembled and then fastened together. The first module B, shown on the right-hand side of the drawing, comprises at least part of the high-pressure body 12*b*, at least part of the intermediate casing 40, part of the low-pressure body 12*a* including its main shaft 12*aa*, as well as the second power drawing means 50.

The second module C, in the center, includes the cover 60, the bearing support 76, the housing 72, and the power drawing means 54.

The third module D, left, includes the shaft 104, the trunnion 61, and the part 86'. This third module is inserted axially inside the second module C until the splines 90 of the damping part 86 and the idler wheel 54*c* cooperate with each other.

The assembly comprising the second and third modules C, D is then mounted at least partially around the first module B, by axial translation from upstream to downstream, until the splines 106 of the shafts 104, 12*aa* cooperate together.

The invention makes it possible to carry out a power drawing on the LP and HP bodies in the same zone and in particular in the same enclosure. The axial stop of each of these bodies is carried out by a thrust ball bearing. One of these bearings, namely that of the HP body (referenced 48*a*), is located in this enclosure E and the other, namely that of the LP body, is located upstream of this enclosure and therefore distant (it is surrounded in FIG. 1). This situation results in a distance between the ball bearing of the LP body and the power drawing on this body. This distance is compensated for by the splined coupling and the hooking of the bearing support 76 and the housing 72 on the same casing.

The invention provides a compact power drawing meshing which is independent of the displacements and displacement chains of the LP body. The drive of the gear 54*b* is carried out by an intermediate part 86, 86' which benefits from a flexible part so as to isolate the meshing from the rest of the engine. The enclosure E is common to the meshing and to the bearings whose lubrication is ensured by nozzles 84, 84'.

The invention claimed is:

1. An aircraft turbine engine, comprising a low-pressure body and a high-pressure body, as well as drawing means for drawing power on at least said low-pressure body, said drawing means comprising a first power drawing shaft extending radially with respect to a longitudinal axis (A) of rotation of said low-pressure and high pressure bodies, the first power drawing shaft comprising a radially inner end carrying a first bevel gear meshed with a first idler bevel wheel driven by said low-pressure body, the aircraft turbine engine further comprising a first annular bearing support extending around said axis and integral with a stator, wherein said first bearing support comprises a first cylindrical portion which extends coaxially with a second cylindrical portion of said idler bevel wheel, these first and second cylindrical portions being guided one inside the other by bearings, and said idler bevel wheel is driven by said low-pressure body through an annular damping part which is independent of said first bearing support.

2. The aircraft turbine engine according to claim 1, wherein said first and second cylindrical portions are guided by two adjacent bearings axially spaced from each other.

3. The aircraft turbine engine according to claim 1, wherein said first bearing support is connected to a housing for guiding said first power drawing shaft.

4. The aircraft turbine engine according to claim 1, wherein said first bearing support has in axial half-section an L-shape which radially inner periphery comprises said first cylindrical portion and is configured to be surrounded at least in part by said idler bevel wheel.

5. The aircraft turbine engine according to claim 1, wherein said idler bevel wheel has in axial half-section an L-shape, which radially inner periphery comprises said second cylindrical portion and is configured to be surrounded at least in part by said bearing support.

6. The aircraft turbine engine according to claim 1, wherein said idler bevel wheel is driven by said low-pressure body via the annular damping part having a capacity for elastic deformation in torsion about at least one of said axis (A) or in a radial direction.

7. The aircraft turbine engine according to claim 1, wherein said idler bevel wheel is driven by said low-pressure body via the annular damping part having at least one of an annular row of through orifices or an annular portion with a C-shaped axial half-section, an opening of which is oriented axially upstream or downstream.

8. The aircraft turbine engine according to claim 1, wherein said first bevel gear and said first idler bevel wheel are housed in a lubrication enclosure configured for lubricating a bearing for guiding the high-pressure body.

9. The aircraft turbine engine according to claim 8, further comprising high pressure drawing means for drawing power on said high-pressure body, the high pressure drawing means comprising a second power drawing shaft extending radially with respect to said axis (A) and comprising a radially inner end carrying a second bevel gear meshing with a second idler bevel wheel driven by said high-pressure body, said second bevel gear and said second idler bevel wheel being housed in said lubrication enclosure.

10. The aircraft turbine engine according to claim 9, further comprising an intermediate casing comprising an annular shroud around which is arranged an annular row of tubular arms, the annular shroud separating said lubrication enclosure from an annular gas flow duct extending around the lubrication enclosure, and extending axially between said first bearing support and said bearing for guiding the high-pressure body, said first and second power drawing shafts extending through different arms of the intermediate casing.

11. A method of modular assembly of the aircraft turbine engine according to claim 10, comprising:
    (a) assembling a first module of the aircraft turbine engine, the first module comprising a part of the high-pressure body, at least a part of the intermediate casing, a first part of the low-pressure body including a main shaft, and the second power drawing means;
    (b) mounting a second turbine engine module and assembling it by axial translation from upstream on and around a part of said first module, the second module comprising said first bearing support and said first power drawing means; and
    (c) mounting a third turbine engine module and assembling it by axial translation from upstream, the third module comprising a second part of the low-pressure body including a secondary shaft, as well as said damping part, the third turbine engine module comprising a part engaged radially between parts of said first and second modules and enabling to engage the main and secondary shafts of the low-pressure body via first splines, and, the damping part carried by said secondary shaft with said idler bevel wheel or an intermediate part already engaged with this idler wheel via second splines.

* * * * *